United States Patent Office 3,641,008
Patented Feb. 8, 1972

3,641,008
PROCESS FOR THE PREPARATION OF PREGN-5-ENE-4,20-DIONES AND INTERMEDIATES IN THE PRODUCTION THEREOF
Bernard Ellis, Graham St., City Road, London, England; Vladimir Petrow, 7612 Miami Ave., Cincinnati, Ohio 45245; and David Neil Stanway, 65 Wicks Crescent, Formby, England
No Drawing. Continuation-in-part of applications Ser. No. 612,363, Jan. 30, 1967, and Ser. No. 612,833, Jan. 31, 1967, now Patent No. 3,478,069. This application May 7, 1969, Ser. No. 822,684
Int. Cl. C07c 173/00
U.S. Cl. 260—239.55     12 Claims

ABSTRACT OF THE DISCLOSURE

Novel 4-oxo-$\Delta^5$-steroids having utility as intermediates for preparation of hormonally active steroids, are prepared by sulfonylating 3$\beta$-hydroxy - 4$\beta$ - hydroxy or acetoxy-$\Delta^5$-steroids to provide novel 3$\beta$-sulfonyloxy steroid intermediates, followed by reacting the 3$\beta$-sulfonyloxy steroid intermediates with an alkaline reagent.

---

This application is a continuation-in-part of our co-pending applications Ser. No. 612,363 filed Jan. 30, 1967 now abandoned and Ser. No. 612,833 filed Jan. 31, 1967 now Pat. No. 3,478,069.

This invention is for improvements in or relating to organic compounds, and has particular reference to 4-oxo-$\Delta^5$-steroids.

It is an object of the present invention to provide a novel process for the preparation of 4-oxo-$\Delta^5$-steroids which are represented by the partial formula

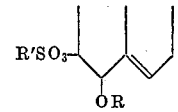
(I)

It is a further object of the present invention to provide novel intermediate compounds used in the preparation of 4-oxo-$\Delta^5$-steroids of partial Formula I.

Another object of the invention is to provide certain novel 4-oxo-$\Delta^5$-steroids of partial Formula I which are believed to have active biological properties of the type possessed by analogous known steroids in particular oestrogenic activity.

Both the novel intermediate compounds and the 4-oxo-$\Delta^5$-steroidal end products of the present invention are also of value as building blocks for the construction of novel hormonally active structures and thus have a technical importance in their own right as intermediates. For example, they serve as starting materials for novel hormonally active compounds, such as, 17$\alpha$-acetoxy-16-methylene-pregn-5-en-4,20-dione, disclosed in Ser. No. 612,833 filed Jan. 31, 1967 (Pat. No. 3,478,069).

The invention provides a process for the preparation of 4-oxo-$\Delta^5$-steroids of partial formula

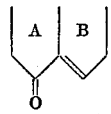
(I)

which process comprises reacting a 3$\beta$,4$\beta$-dihydroxy-$\Delta^5$-steroidal derivative of partial formula

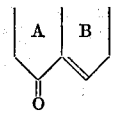
(II)

where R is hydrogen, an acyl or aroyl group containing up to ten carbon atoms, with an alkyl or arylsulphonyl halide to form the corresponding 3$\beta$-alkylsulphonyloxy or 3$\beta$-arylsulphonyloxy derivative of partial formula

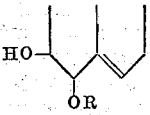
(III)

where R is as above defined, and R' is an alkyl or aryl group, and reacting the 3$\beta$-alkylsulphonyloxy or 3$\beta$-arylsulphonyloxy intermediate (III) with a basic reagent.

The basic reagent is preferably a source of hydroxyl ions.

The starting materials of partial Formula II employed for the process of the present invention may be prepared by methods of prior art such, for example, as are described by Rosenhein and Starling (J., 1937, 377) and by Petrow, Rosenhein and Starling (J., 1943, 135). Conversion of the starting material into the intermediate (III) may be achieved by treating (II) in a suitable organic base, such as pyridine, with not less than one equivalent of an alkyl- or arylsulphonyl halide, preferably methane- or toluene-p-sulphonyl chloride. The reaction proceeds satisfactorily at ambient temperatures and is generally complete within 18 hours. Thereafter the product may be isolated by standard procedures such, for example, as pouring the reaction mixture into a large excess of water and recovering the precipitate. Derivatives (III) obtained in this way are, in general, sufficiently pure for use in the next stage of the process, but may be purified, if so desired, by recrystallisation.

Conversion of the intermediate (III) into the required 4-oxo-$\Delta^5$-steroid (I) may be accomplished by treating (III), where R is hydrogen, in a suitable solvent such as a lower alkanol, with not less than one equivalent of a strong alkali, such as sodium or potassium hydroxide optionally dissolved in a suitable solvent such as water or a lower alkanol. Not less than two equivalents of strong alkali are required for the treatment of (III) in which R is an acyl or aroyl group as above defined. The mixture is preferably heated, conveniently at reflux temperature, until conversion into the 4-oxo-$\Delta^5$-steroid (I) is complete. Thereafter the product (I) may be isolated by techniques well-known to those skilled in the art, and purified by crystallisation or chromatography.

The process of the invention may be applied to steroids additionally containing standard steroidal substituents elsewhere in the molecule. It will be apparent to those skilled in the art that hydroxy, acyloxy, halo and other alkali-sensitive groups, and epoxy and other "sulphonating reagent" sensitive groups may undergo reaction with the reagents empolyed in one or other or both stages of the process of the invention and appropriate allowance should be made for this fact.

The invention provides novel 3$\beta$-alkylsulphonyloxy and 3$\beta$-arylsulphonyloxy-$\Delta^5$-steroid intermediate derivatives of partial Formula III, and in particular the following compounds:

4$\beta$-acetoxy-3$\beta$-toluene-p-sulphonyloxyandrost-5-en-17-one
4$\beta$-hydroxy-3$\beta$-toluene-p-sulphonyloxyandrost-5-en-17-one
4$\beta$-acetoxy-3$\beta$-methanesulphonyloxyandrost-5-en-17-one
4$\beta$-acetoxy-17$\beta$-hydroxy-17$\alpha$-methyl-3$\beta$-toluene-p-sulphonyloxy androst-5-ene
4$\beta$,17$\alpha$-diacetoxy-3$\beta$-toluene-p-sulphonyloxypregn-5-en-20-one
4$\beta$,17$\alpha$-diacetoxy-3$\beta$-methanesulphonyloxypregn-5-en-20-one 4β-acetoxy-16α,17α-epoxy-16β-methyl-3β-toluene-p-sulphonyloxypregn-5-en-20-one 4β-acetoxy-17α-hydroxy-16-methylene-3β-toluene-p-sulphonyloxypregn-5-en-20-one 4β,17α-diacetoxy-16-methylene-3β-toluene-p-sulphonyloxypregn-5-en-20-one The invention also provides the following novel 4-oxo-Δ$^5$-steroids:

17β-hydroxy-17α-methylandrost-5-en-4-one
16α,17α-epoxy-16β-methylpregn-5-ene-4,20-dione
17α-hydroxy-16-methylenepregn-5-ene-4,20-dione
177α-hydroxypregn-5-ene-4,20-dione Following is a description by way of example of methods of carrying the invention into effect.

EXAMPLE 1

4β-acetoxy-3β-hydroxyandrost-5-en-17-one (4 g.) in pyridine (30 ml.) was treated with toluene-p-sulphonyl chloride (4 g.) and the mixture kept at ambient temperature for 16 hours. The product obtained by precipitation with water was recrystallised from a mixture of acetone and hexane to give 4β-acetoxy-3β-toluene-p-sulphonyloxyandrost-5-en-17-one, M.P. 127–129° C., (decomp.), $[\alpha]_D$ −35.8°.

4β-acetoxy-3β- toluene - p - sulphonyloxyandrost-5-en-17-one (1 g.), dissolved in hot ethanol (50 ml.) was treated with N/10 aqueous potassium hydroxide solution (60 ml.), and the reaction mixture heated under reflux for 30 minutes. Water (40 ml.) was then added and the solvents evaporated to 60 ml., when, on cooling, the product separated. Purification by chromatography on alumina, and recrystallisation from a mixture of acetone and hexane gave androst-5-en-4,17-dione, M.P. 138° C., $[\alpha]_D^{24}$ +5.1°, identical with an authentic specimen, prepared by the method of Butenandt et al., Elsevier's Encyclopaedia of Organic Chemistry, vol. 14, p. 2897S.

EXAMPLE 2

4β-acetoxy-3β-hydroxyandrost-5-en-17-one (2 g.) dissolved in pyridine (10 ml.) was cooled to 0° C. and treated dropwise with methane sulphonyl chloride (3 ml.). The reaction mixture was kept at room temperature for 18 hours, poured into water, and the precipitate collected. Recrystallisation from a mixture of acetone and hexane gave 4β-acetoxy-3β-methanesulphonyloxyandrost-5-en-17-one, M.P. 113° C. (decomp.), $[\alpha]_D^{26°}$ −54.6°.

4β-acetoxy - 3β - methanesulphonyloxyandrost-5-en-17-one (1 g.), dissolved in hot ethanol (50 ml.), was treated with N/10 aqueous potassium hydroxide solution (60 ml.), and the reaction mixture heated under reflux for 30 minutes. Water (40 ml.) was then added, and the solvents evaporated to 60 ml., when, on cooling, the product separated. Purification by chromatography on alumina, and recrystallisation from a mixture of acetone and hexane, gave androst-5-ene-4,17-dione, M.P. 138° C., identical with an authentic specimen, prepared by the method of Butenandt et al., Elsevier's Encyclopaedia of Organic Chemistry, vol. 14, p. 2897S.

EXAMPLE 3

3β,4β-dihydroxyandrost-5-en-17-one (1 g.), dissolved in pyridine (10 ml.) was treated with toluene-p-sulphonyl chloride (1 g.) and kept at ambient temperature for 17 hours. The product obtained by dilution with water was recrystallised from a mixture of acetone and hexane to give 4β-hydroxy-3β-toluene-p-sulphonyloxyandrost-5-en-17-one, M.P. 112° C., (decomp.), $[\alpha]_D^{26°}$ −51.8°.

4β-hydroxy - 3β - toluene-p-sulphonyloxyandrost-5-en-17-one (1 g.), dissolved in hot ethanol (40 ml.) was treated with N/10 aqueous potassium hydroxide solution (30 ml.), and the reaction mixture heated under reflux for 30 minutes. Water (50 ml.) was added and the solvents evaporated to 60 ml., when, on cooling, the product separated. Purification by chromatography on alumina and recrystallisation from a mixture of acetone and hexane gave androst-5-ene-4,17-dione, M.P. 138° C., identical with an authentic specimen prepared by the method of Butenandt et al., Elsevier's Encyclopaedia of Organic Chemistry, vol. 14, p. 2897S.

EXAMPLE 4

4β - acetoxy - 17α - methylandrost - 5 - ene-3β,17β-diol (2.5 g.), dissolved in pyridine (20 ml.), was treated with toluene-p-sulphonyl chloride (2.5 g.) and the mixture kept at room temperature for 16 hours. The product obtained by dilution with water was recrystallised from aqueous acetone to give 4β - acetoxy - 17α - methyl-3β-toluene-p-sulphonyloxyandrost - 5 - en - 17β - ol, M.P. 117° C., (decomp.), $[\alpha]_D^{27°}$ −87.4°.

4β - acetoxy - 17α - methyl - 3β - toluene-p-sulphonyloxyandrost-5-en-17β-ol (2 g.), dissolved in hot ethanol (100 ml.) was treated with N/10 aqueous potassium hydroxide solution (100 ml.) and the reaction mixture heated under reflux for 30 minutes. Water (100 ml.) was added and the solvents evaporated to 120 ml., when, on cooling, a solid precipitate was formed, which was isolated by extraction with ether. Recrystallisation of the crude product from aqueous methanol gave 17β - hydroxy - 17α - methylandrost - 5 - en - 4 - one, M.P. 149° C., $[\alpha]_D^{27°}$ −61.3°, $\lambda_{max.}$ 243 mμ ($\epsilon$ 6,840).

EXAMPLE 5

4β,17α-diacetoxy - 3β - hydroxypregn - 5 - en - 20 - one (3 g.) dissolved in pyridine (30 ml.) was treated with toluene-p-sulphonyl chloride (3 g.) and the mixture kept at ambient temperature for 23 hours. It was poured into water and the product isolated by extraction with ether. The product was purified by chromatography on alumina, followed by recrystallisation from aqueous methanol to give 4β,17α-diacetoxy - 3β - toluene-p-sulphonyloxypregn-5-en-20-one, M.P. 99–101° C., $[\alpha]_D^{23}$ −68.9°.

4β,17α - diacetoxy - 3β - toluene-p-sulphonyloxypregn-5-en-20-one (0.5 g.) dissolved in ethanol (20 ml.) was heated under reflux, and 0.1 N aqueous potassium hydroxide solution (25.5 ml.) was added dropwise over a period of 10 minutes. The reaction mixture was heated under reflux for a further ½ hour, diluted with water (20 ml.) and the solvents evaporated to a volume of 40 ml. On cooling, the precipitate was collected to give 17α-hydroxypregn - 5 - ene - 4,20 - dione, $\lambda_{max.}$ 241 mμ ($\epsilon$ 6,780).

EXAMPLE 6

4β,17α - diacetoxy - 3β - hydroxypregn-5-en-20-one (2 g.) in pyridine (20 ml.) was cooled to 0° C., the solution stirred, and methane sulphenyl chloride (2 ml.) was added dropwise. The reaction mixture was allowed to reach ambient temperature, kept at this temperature for 16 hours, and then poured into water (20 ml.). The precipitate was collected and purified by chromatography on alumina to give 4β,17α - diacetoxy - 3β - methanesulphonyloxypregn-5-en-20-one.

4β,17α - diacetoxy-3β - methanesulphonyloxypregn-5-en-20-one (1 g.) dissolved in ethanol (50 ml.) was heated under reflux, and 0.1 N aqueous potassium hydroxide solution (59 ml.) was added dropwise over a period of 10 minutes. The reaction mixture was heated under reflux for a further 30 minutes, diluted with water (40 ml.) and the solvents evaporated to 60 ml. On cooling, the product separated and was collected to give 17α-hydroxypregn - 5 - ene - 4,20 - dione, $\lambda_{max.}$ 241 mμ ($\epsilon$ 6,780).

EXAMPLE 7

4β - acetoxy - 3β,17α - dihydroxy - 16 - methylenepregn-5-en-20-one (2 g.) dissolved in pyridine (20 ml.), was treated with toluene-p-sulphonyl chloride (2 g.) and the mixture kept at room temperature for 18 hours. The product obtained by dilution with water was recrystallised from a mixture of acetone and hexane to give 4β- acetoxy - 17α - hydroxy - 16 - methylene - 3β - toluene-p-sulphonyloxypregn - 5 - en - 20 - one, M.P. 134° C., (decomp.), $[\alpha]_D^{22°}$ —135.5°.

4β - acetoxy - 17α - hydroxy - 16 - methylene-3β-toluene-p-sulphonyloxypregn - 5 - en - 20 - one (1 g.), in ethanol (40 ml.) was heated under reflux, and 0.1 N aqueous potassium hydroxide solution (36 ml.) was added dropwise over a period of 10 minutes. The reaction mixture was heated under reflux for a further 30 minutes, diluted with water (40 ml.) and the solvents evaporated to a volume of 80 ml. On cooling, the product separated and was collected to give 17α - hydroxy - 16 - methylene-pregn-5-ene-4,20-dione, $\lambda_{max}$. 240 m$\mu$ ($\epsilon$ 7,070).

EXAMPLE 8

4β,17α - diacetoxy - 3β - hydroxy - 16 - methylene-pregn-5-en-20-one (1 g.) dissolved in pyridine (10 ml.) was treated with toluene-p-sulphonyl chloride (1 g.) and the mixture kept at room temperature for 20 hours. It was poured into water (100 ml.) and the product was isolated by extraction with ether. The ether phase was washed with dilute sulphuric acid to remove pyridine, dried over sodium sulphate and evaporated to give 4β, 17α - diacetoxy - 16 - methylene - 3β - toluene-p-sulphonyloxypregn-5-en-20-one.

4β,17α - diacetoxy - 16 - methylene - 3β - toluene-p-sulphonyloxypregn - 5 - en - 20 - one (0.73 g.) dissolved in ethanol (30 ml.) was heated under reflux, and 0.085 N aqueous potassium hydroxide solution (43.1 ml.) was added dropwise over a period of 10 minutes. The reaction mixture was heated under reflux for a further 30 minutes, diluted with water (20 ml.) and the solvents evaporated to 75 ml. On cooling, a finely-divided solid separated and was isolated by extraction with ether to give 17α - hydroxy - 16 - methylenepregn - 5 - ene-4,20-dione, $\lambda_{max}$. 240 m$\mu$ ($\epsilon$ 7,090).

EXAMPLE 9

4β - acetoxy - 16α,17α - epoxy - 3β - hydroxy - 16β-methylpregn - 5 - en - 20 - one (5 g.) dissolved in pyridine (50 ml.) was treated with toluene-p-sulphonyl chloride (5 g.) and the mixture kept at room temperature for 16 hours. The product was precipitated by dilution with water, and purified by recrystallisation from a mixture of acetone and hexane to give 4β - acetoxy-16α,17α-epoxy - 16β - methyl - 3β - toluene-p-sulphonyloxypregn-5-en - 20 - one, M.P. 132.5° C., $[\alpha]_D^{22°}$ —42.3°.

4β - acetoxy - 16α,17α - epoxy - 16β - methyl-3β-toluene-p-sulphonyloxypregn - 5 - en - 20 - one (2 g.) dissolved in hot ethanol (100 ml.) was treated with 0.1 N aqueous potassium hydroxide solution (100 ml.), and the mixture heated under reflux for 30 minutes. Water (100 ml.) was added and the solvents evaporated to a volume of 230 ml. On cooling, the product separated and was collected by filtration to give 16α,17α-epoxy-16β-methylpregn-5-ene-4,20-dione.

We claim:

1. A process for the preparation of a pregn-5-ene-4,20-dione steroid compound comprising reacting a compound selected from the group consisting of 3β,4β-dihydroxy-pregn-5-enes and 3β-hydroxy-4β-acyloxy-pregn-5-enes, wherein acyl is a residue of a carboxylic acid containing up to 10 carbon atoms, with a sulfonylating agent to provide the corresponding 3β-sulfonyloxy derivative and reacting the said 3β-sulfonyloxy derivative with an alkali metal hydroxide to remove the 3β-sulfonyloxy substituent and convert the 4β-hydroxy or 4β-acyloxy substituent to a 4-keto group.

2. The process of claim 1 wherein the sulfonylating agent is selected from the group consisting of mesyl and tosyl halides.

3. The process of claim 1 wherein the 3β,4β-dihydroxy-5-ene compound is reacted in an organic base with not less than one equivalent of sulfonylating agent.

4. The process of claim 3 wherein the organic base is pyridine.

5. The process of claim 1 wherein the 3β-sulfonyloxy derivative is reacted with not less than one equivalent of alkali metal hydroxide when the 3β-sulfonyloxy derivative contains a 4β-hydroxy radical.

6. The process of claim 1 wherein the 3β-sulfonyloxy derivative is reacted with not less than two equivalents alkali metal hydroxide when the 3β-sulfonyloxy derivative contains a 4β-acyloxy radical.

7. The process of claim 5 wherein the 3β-sulfonyloxy derivative is reacted in the presence of a lower alkanol with an alkali metal hydroxide selected from the group consisting of sodium and potassium hydroxide dissolved in a compound selected from the group consisting of water and a lower alkanol.

8. The process of claim 6 wherein the 3β-sulfonyloxy derivative is reacted in the presence of a lower alkanol with an alkali metal hydroxide selected from the group consisting of sodium and potassium hydroxide dissolved in a compound selected from the group consisting of water and a lower alkanol.

9. 16α,17α-epoxy-16β-methylpergn-5-ene-4,20-dione.

10. 4β - acetoxy - 16α,17α - epoxy - 16β - methyl-3β-toluene-p-sulfonyloxypregn-5-en-20-one.

11. 4β - acetoxy - 17α - hydroxy - 16 - methylene - 3β-toluene-p-sulfonyloxypregn-5-en-20-one.

12. 4β,17α - diacetoxy - 16 - methylene - 3β - toluene - p-sulfonylpregn-5-en-20-one.

No references cited.

ELBERT L. ROBERTS, Primary Examiner

U.S. Cl. X.R.

260—397.3, 397.4